United States Patent
Dion

(10) Patent No.: US 7,601,398 B2
(45) Date of Patent: Oct. 13, 2009

(54) RESIN TREATMENT OF FIBROUS SHEETS

(75) Inventor: Andrew N. Dion, Puyallup, WA (US)

(73) Assignee: Arclin Surfaces Inc., Hayward, WI (US)

( * ) Notice: Subject to any disclaimer, the term of this patent is extended or adjusted under 35 U.S.C. 154(b) by 324 days.

(21) Appl. No.: 11/347,595

(22) Filed: Feb. 3, 2006

(65) Prior Publication Data

US 2006/0182979 A1   Aug. 17, 2006

Related U.S. Application Data

(60) Provisional application No. 60/653,426, filed on Feb. 16, 2005.

(51) Int. Cl.
*B05D 1/36* (2006.01)
*B05D 7/00* (2006.01)
*B32B 3/00* (2006.01)

(52) U.S. Cl. .................... 427/407.1; 427/404; 428/160; 428/164

(58) Field of Classification Search ............... 427/207.1, 427/208.8, 404, 412, 407.1; 428/160, 164
See application file for complete search history.

(56) References Cited

U.S. PATENT DOCUMENTS

| 5,008,359 A | 4/1991 | Hunter |
| 5,140,086 A | 8/1992 | Hunter et al. |
| 5,580,922 A | 12/1996 | Park et al. |

FOREIGN PATENT DOCUMENTS

JP    2003/001050    *   1/2003

* cited by examiner

*Primary Examiner*—Lynda Salvatore
(74) *Attorney, Agent, or Firm*—Birch, Stewart, Kolasch & Birch, LLP

(57) ABSTRACT

A method of forming an impregnated fibrous sheet comprising impregnating a fibrous material with a tin catalyst to form a catalyst-impregnated material, treating the catalyst-impregnated material with a polyisocyanate composition to form a polyisocyanate-impregnated fibrous material, and curing the polyisocyanate-impregnated fibrous material to provide a resin-impregnated fibrous sheet. Laminated materials and a method of producing the same are also provided.

18 Claims, No Drawings

RESIN TREATMENT OF FIBROUS SHEETS

CROSS-REFERENCE TO RELATED PATENT APPLICATION

This application is a application claiming the benefit under 35 USC 119(e) U.S. application Ser. No. 60/653,426, filed Feb. 16, 2005, which is incorporated herein by reference in its entirety.

BACKGROUND

The manufacture of polyisocyanate-impregnated materials is generally known in the art. Polyisocyanates have had a range of use as adhesives and binders in forming composite wood products such as hard-board and particleboard. Various paper and other related products have been impregnated with polyisocyanates for use with decorative paneling or coverings for products (such as foam). Some known methods of making such products is to at least partially impregnate a sheet such as kraft linerboard with an uncatalyzed polyfunctional isocyanate. Typically, several sheets are impregnated and cured in a press under heat and pressure to form thin panels. The use of catalysts is sometimes avoided in the process because the catalysts are thought to cause poor adhesion between various layers of the laminates.

SUMMARY

The present invention relates generally to the field of polyisocyanate impregnated fibrous materials and methods of making the same. A method of forming an impregnated fibrous sheet which includes impregnating a fibrous material with isocyanate polymerization catalyst to form a catalyst-impregnated material, and treating the catalyst-impregnated material with a polyisocyanate composition to form a polyisocyanate-impregnated fibrous material is provided. The polyisocyanate-impregnated fibrous material is then cured to provide a resin-impregnated fibrous sheet. The isocyanate polymerization catalyst may be a metal complex, such as a tin-based isocyanate polymerization catalyst, or an aliphatic tertiary amine. The polyisocyanate composition employed to treat the catalyst-impregnated material may be a neat isocyanate resin (i.e., substantially undiluted with other components) or may include a combination of isocyanate resin and an appropriate solvent. The solvent is typically selected to have one or more of a number of advantageous properties, such a being substantially odorless and colorless, having low viscosity (particularly at the application temperature of the polyisocyanate composition), low toxicity, low vapor pressure at room temperature, and/or low flammability (e.g., having a flashpoint of at least about 100 degrees C. and often higher).

ILLUSTRATIVE EMBODIMENTS

Illustrative Embodiment 1

One illustrative embodiment relates to a method of forming an impregnated fibrous sheet. The method comprises impregnating a fibrous material with a tin catalyst to form a catalyst-impregnated material, treating the catalyst-impregnated material with a polyisocyanate composition to form a polyisocyanate-impregnated fibrous material, and curing the polyisocyanate-impregnated fibrous material to provide a resin-impregnated fibrous sheet. The curing step may comprise heating the polyisocyanate-impregnated fibrous material. Typically, the curing operation may be carried out at ambient pressure, but in some cases the curing step may comprise heating the polyisocyanate-impregnated fibrous material under pressure, e.g., under a pressure of no more than about 50 psig.

The impregnating step may comprise treating the catalyst-impregnated material with a sufficient amount of the polyisocyanate composition to provide a resin-impregnated fibrous sheet with a resin content of about 10 to 75 wt. %.

The tin catalyst may comprise dialkyl tin dicarboxylate, trialkytin hydroxide, dialkytin oxide, dialkyltin dialkoxide, dialkyltin dihalide or a mixture thereof. The dialkyl tin dicarboxylate may comprise diethyl tin diacetate, dibutyltin diacetate, dibutyltin dilaurate, dibutyltin maleate, dilauryltin diacetate, dioctyltin diacetate, dibutyltin-bis(4-methylaminobenzoate), dibuytyltin dilaurylmercaptide, dibutyltin-bis(6-methylaminocaproate), dibutyltin-bis(2-dimethylaminopentylate) or a mixture thereof.

The tin catalyst may comprise tin(II) carboxylate. The tin(II) carboxylate may comprise tin(II) acetate, tin(II) octoate, tin(II) ethylhexoate, tin(II)laurate, or a mixture thereof.

The tin catalyst may comprise dibutyltin dilaurylmercaptide, trimethyltin hydroxide, tributyltin hydroxide, trioctyltin hydroxide, dibutyltin oxide, dioctyltin oxide, dilauryltin oxide, dibutyltin-bis(isopropoxide), or a mixture thereof.

The dialkyltin dihalide may comprise dibutyltin dichloride, dioctyltin dichloride, dilauryltin dichloride, or a mixture thereof.

The treating step may comprise coating one side of the catalyst-impregnated material with the polyisocyanate composition.

The impregnating operation may comprise treating the fibrous material with a catalyst solution which includes solvent and the tin catalyst. The catalyst solution may also include one or more functional additives. Examples of suitable functional additives which may be included in the catalyst solution and impregnated into the fibrous material with the isocyanate polymerization catalyst include colorant(s) and/or releasing agent(s).

The catalyst solvent may comprise an alkanol, typically one with 1-6 carbon atoms, such as methanol, ethanol, butanol, isopropanol or a mixture thereof. In some cases, the catalyst solution may include at least about 85 wt. % MeOH. The catalyst solutions which include a mixture of methanol and isopropanol may be desirable, e.g., when the tin catalyst includes a dialkyltin dicarboxylate, such as dibutyltin dilaurate.

The impregnating operation may further comprise removing at least a portion of the solvent from the fibrous material before impregnating the catalyst-impregnated material with the polyisocyanate composition. The removing step may comprise heating the fibrous material treated with the catalyst solution material. The removing step may comprise heating the material at a temperature of about 200 to 300 degrees F., preferably about 225 to 275 degrees F. The removing step may comprise subjecting the fibrous material treated with the catalyst solution to a vacuum.

The polyisocyanate composition commonly comprises solvent and the polyisocyanate resin. The solvent may comprise ketone solvent, carbonate solvent, phthalate diester, phosphate triester (e.g., triaryl and/or alkyl aryl phosphate triesters), ether solvent, polyol ester, alkyl acetate, polycarboxylate alkyl ester or a mixture thereof. The solvent may comprise propylene carbonate, benzyl butyl phthalate ester, triacetin, triethyl citrate, or a mixture thereof. The solvent may comprise aromatic solvent. The aromatic solvent may comprise halogenated aromatic solvent, nitroaromatic solvent, alkylated aromatic solvent or a mixture thereof.

The polyisocyanate composition may have a Brookfield viscosity of no more than about 250 cps at 77 degrees F. In some cases it may be desirable to employ a polyisocyanate composition with a Brookfield viscosity of about 80 to 140 cps at 77 degrees F.; and circa 80 to 120 cps at 85 to 95 degrees F.

The fibrous material may be a kraft paper or a linerboard. The fibrous material may comprise chemically pulped wood fiber, thermomechanical wood pulp, mechanically defibered wood pulp, or a mixture thereof.

The curing operation may comprise heating the polyisocyanate-impregnated fibrous material at about 250 to 350 degrees F., typically about 280 to 310 degrees F. In some cases, the curing operation may comprise heating the polyisocyanate-impregnated fibrous material under pressure.

Illustrative Embodiment 2

Another illustrative embodiment relates to a polyisocyanate-impregnated fibrous sheet produced as described in illustrative embodiment 1. The fibrous material may be treated with a catalyst solution which includes a functional additive in addition to the isocyanate polymerization catalyst. For example, the functional additive may be a colorant. In one suitable example, The fibrous material may be treated with a catalyst solution which includes an alcohol solvent, e.g., a mixture of methanol and isopropanol, a dialkyltin dicarboxylate and an alcohol soluble dye, such as alcohol soluble Nigrosine dye.

Illustrative Embodiment 3

Another illustrative embodiment relates to a method of forming an impregnated fibrous sheet. The method may comprise impregnating a fibrous material with a catalyst solution which includes first solvent and a tin catalyst to form a catalyst-treated material, removing at least a portion of the solvent from the catalyst-treated material to form a catalyst-impregnated material, treating the catalyst-impregnated material with a polyisocyanate composition to form a polyisocyanate-impregnated fibrous material, and curing the polyisocyanate-impregnated fibrous material to provide a resin-impregnated fibrous sheet. The resin-impregnated fibrous sheet has a resin content of about 10 to 75 weight percent.

The curing step may comprise heating the polyisocyanate-impregnated fibrous material under pressure.

The curing step may comprise heating the polyisocyanate-impregnated fibrous material sufficiently to convert the polyisocyanate composition to at least a C-stage resin.

The fibrous material may be a kraft paper.

The fibrous material is a linerboard.

The fibrous material may comprise chemically pulped wood fiber, a thermomechanical wood pulp, a mechanically defibered wood pulp, or a mixture thereof.

The removing step may comprise heating the catalyst-treated material.

The removing step may comprise heating the catalyst-treated material at a temperature of about 200 to 300 degrees F.

The removing step may comprise subjecting the catalyst-treated material to a vacuum.

The tin catalyst may comprise dialkyl tin dicarboxylate. The tin catalyst may comprise dibutyltin dilaurate.

The tin catalyst may comprise tin(II) carboxylate, trialkytin hydroxide, dialkytin oxide, dialkyltin dialkoxide, dialkyltin dihalide or a mixture thereof.

The first solvent may comprise methanol, ethanol, butanol, isopropanol, or a mixture thereof.

The treating step may comprise coating one side of the catalyst-impregnated material with the polyisocyanate composition.

The polyisocyanate composition may comprise a second solvent and the polyisocyanate resin. The second solvent may comprise ketone solvent, carbonate solvent, phthalate ester, triaryl phosphate ester, ether solvent, polyol ester, alkyl acetate, alkyl polycarboxylate ester, or a mixture thereof. The second solvent may comprise propylene carbonate. The second solvent may comprise triacetin, triethyl citrate, or a mixture thereof. The second solvent may comprise benzyl butyl phthalate ester. The second solvent may comprise aromatic solvent. The aromatic solvent may comprise halogenated aromatic solvent, nitroaromatic solvent, alkylated aromatic solvent or a mixture thereof.

The polyisocyanate composition has a Brookfield viscosity of no more than about 250 cps at 77 degrees F. The polyisocyanate composition may have a Brookfield viscosity of about 140 cps.

Illustrative Embodiment 4

Another illustrative embodiment relates to a polyisocyanate-impregnated fibrous sheet produced as described in Illustrative Embodiment 3.

Illustrative Embodiment 5

A fibrous sheet may comprise a fibrous material impregnated with a tin catalyst and a polyisocyanate resin wherein the resin has been cured to at least a C-stage.

The fibrous sheet may comprise about 10 to 75 wt. % of the polyisocyanate resin.

The fibrous material may be a kraft paper.

The fibrous material may be a linerboard.

The fibrous material may comprise chemically pulped wood fiber, thermomechanical wood pulp, mechanically defibered wood pulp, or a mixture thereof.

The fibrous sheet may comprise about 0.05 to 0.25 wt. % of the tin catalyst.

The fibrous sheet may further comprise a phenolic glueline on at least one side of said fibrous sheet.

The polyisocyanate resin may comprise a polymeric diphenylmethane diisocyanate.

Illustrative Embodiment 6

Another illustrative embodiment relates to a method of producing a laminated material comprising applying an adhesive glueline, e.g., a phenolic glueline, to at least one side of the resin-impregnated fibrous sheet wherein the resin-impregnated fibrous material is impregnated with a tin catalyst and a polyisocyanate resin. The resin has typically been cured to a C-stage resin prior to application of the adhesive glueline.

The method may further comprise bonding the phenolic side of the fibrous sheet to a substrate. The bonding operation may comprise heating the fibrous sheet and substrate in a press at about 250 to 300 degrees F. The bonding operation may comprise heating the fibrous sheet and substrate under a pressure of 150 to 250 psi. The substrate may comprise multilayer composite material. The substrate may be fiberboard, plywood or particleboard.

Illustrative Embodiment 7

Another illustrative embodiment relates to a method of producing a laminated material comprising providing a resin-impregnated fibrous sheet having a phenolic glueline on a side wherein the resin-impregnated fibrous material is formed by a process which includes impregnating a fibrous sheet with a tin catalyst and a polyisocyanate resin, and curing the resin in the impregnated material to a C-stage resin. The phenolic side of the resin-impregnated fibrous sheet may be bond to a substrate, such a wood composite material.

ILLUSTRATIVE EXAMPLES

Example 1

A resin-impregnated fibrous sheet may be formed according to the following process. A fibrous material (Kraft paper or linerboard) is impregnated with a catalyst solution which includes solvent (e.g., MeOH:IPA at about 95:5 (w/w) and a tin catalyst (e.g., 0.5 weight percent dibutyltin dilaurate) to form a catalyst-treated material. At least a portion of or all of the solvent is removed from the fibrous material by heating the catalyst-treated material at a temperature between about 200 to 300 degrees F. for 1 to 5 minutes to form a catalyst-impregnated material with a volatile of no more than 6%, preferably 2-4%. The catalyst impregnated material is treated with a polyisocyanate composition, which typically has a Brookfield viscosity of about 80 to 110 cps as applied, to form a polyisocyanate-impregnated fibrous material. The polyisocyanate composition may consist essentially of polyisocyanate resin or in addition to the resin may optionally include solvent or plasticizers, such as propylene carbonate and/or triacetin. To achieve the desired viscosity for application, the polyisocyanate composition may be heated to slightly above ambient temperature (e.g., to about 80 to 100 degrees F.). The polyisocyanate-impregnated fibrous material is cured to provide a resin-impregnated fibrous sheet having a resin content of about 15 to 75 weight percent. The polyisocyanate-impregnated fibrous material is cured by heating the polyisocyanate-impregnated fibrous material to convert the polyisocyanate composition to a cured C-stage resin. Typically, the resin-impregnated sheet can be fully cured by heating in a 250-350 degree F. oven for about 1-5 minutes.

Example 2

A resin-impregnated fibrous sheet was formed according to the following process. A Westvaco Linerboard Kraft (69 lbs/1000 ft$^2$) (e.g., fibrous material) was impregnated with a catalyst solution which includes methanol, isopropanol (MeOH:IPA—90:5 (w/w)), 0.5 weight percent dibutyltin dilaurate, and about 5.0 weight percent Nigrosine dye solution to form a catalyst-treated material. Other solvent dyes or dyes dispersible in solvents can be used. At least a portion, or all, of the solvent was removed from the fibrous material by heating the catalyst-treated material at a temperature between about 240 to 260 degrees F. for 2 to 3 minutes to form a catalyst-impregnated material with a volatile content of 2-4 weight percent. The catalyst impregnated material was treated by coating one side with a polyisocyanate composition, which includes 13 wt. % triacetin and 87 wt. % polyisocyanate resin (Mondur 541 Light PMDI available from Bayer Polymers, Pittsburgh, Pa.), to form a polyisocyanate-impregnated fibrous material. The polyisocyanate composition was heated to about 80 degrees F. prior to application and has a Brookfield viscosity of about 100 to 105 cps as applied. The polyisocyanate-impregnated fibrous material was cured to provide a resin-impregnated fibrous sheet having a resin content of about 20 to 25 weight percent by heating the polyisocyanate-impregnated fibrous material in a 300 degree F. oven for about 1-3 minutes. This converted the resin in the polyisocyanate-impregnated fibrous material to a C-stage resin. A water drop test, swab wipe test, and indicator solution test were each performed to determine and confirm the stage of curing and penetration through the fibrous sheet. It was believed that the presence of moisture and solvent in the catalyst treated material would more rapidly advance the polyisocyanate reaction, since it reacts with OH groups. However, it was discovered that the presence of residual solvent, such as methanol/isopropanol, reduces the polyisocyanate resin penetration into the paper and slows the cure. A decrease in the volatiles of the catalyzed paper prior to saturation, e.g., to the range of 2-4%, reduces surface resin and blistering and corresponded to an improvement in penetration. The paper typically has a 6-8% moisture content, so it is preferable to remove substantially all of the solvent in addition to some of the moisture in the paper prior to coating with the polyisocyanate resin. Resin cure temperatures did not significantly influence surface resin or blistering.

Example 3

A resin-impregnated fibrous sheet was formed according to the following process. A Westvaco Linerboard Kraft (69 lbs/1000 ft$^2$) (e.g., fibrous material) was impregnated with a catalyst solution which includes methanol, isopropanol (MeOH:IPA—90:5 w/w), 0.5 weight percent dibutyltin dilaurate, and about 5.0 weight percent Nigrosine dye solution, to form a catalyst-treated material. At least a portion of the solvent was removed from the fibrous material by heating the catalyst-treated material at a temperature between about 240 to 260 degrees F. for 2 to 3 minutes to form a catalyst-impregnated material with a volatile content of 2-4 weight percent. The catalyst impregnated material was treated by coating one side with a polyisocyanate resin composition (Mondur 541 Light PMDI available from Bayer Polymers, Pittsburgh, Pa.) to form a polyisocyanate-impregnated fibrous material. The polyisocyanate composition was heated to about 90 to 95 degrees F. prior to application and has a Brookfield viscosity of about 95 to 108 cps as applied. The polyisocyanate-impregnated fibrous material was cured to provide a resin-impregnated fibrous sheet having a resin content of about 20 to 25 weight percent by heating the polyisocyanate-impregnated fibrous material in a 300 degree F. oven for about 1-3 minutes. This converts the resin in the polyisocyanate-impregnated fibrous material to a C-stage resin. A water drop test was performed to determine and confirm the stage of curing.

Example 4

A resin-impregnated fibrous sheet was formed according to the following process. WestVaco Linerboard Kraft (69 lbs/1000 ft$^2$) (e.g., fibrous material) was impregnated with a catalyst solution which includes methanol, isopropanol (MeOH:IPA—95:5 (w/w)), 0.5 weight percent dibutyltin dilaurate, and about 5.0 weight percent black dye to form a catalyst-treated material. At least a portion of the solvent was removed by heating the catalyst-treated material at a temperature between about 240 to 260 degrees F. for 20 seconds to form a catalyst-impregnated material. The catalyst impregnated material was treated by coating one side with a polyisocyanate composition, which includes 13 wt. % triacetin and 87 wt. % polyisocyanate resin (Mondur 541 Light PMDI available from Bayer Polymers, Pittsburgh, Pa.), to form a polyisocyanate-impregnated fibrous material. The polyisocyanate composition was warmed to 95 degrees F. as applied. The polyisocyanate-impregnated fibrous material was partially cured to provide a resin-impregnated fibrous sheet having a resin content of about 23 to 25 weight percent and a volatile content of 2 to 4 weight percent by heating the polyisocyanate-impregnated fibrous material in a 250 degree F. oven for 2 to 3 minutes. This converted the resin in the polyisocyanate-impregnated fibrous material to a C-stage resin. A decrease in volatiles reduces surface resin and blistering and corresponded to an improvement in penetration. Resin cure temperatures did not significantly influence surface resin or blistering.

Example 5

A resin-impregnated fibrous sheet was formed according to the following process. Mead-Westvaco Linerboard Kraft (33 lbs/1000 ft$^2$) (e.g., fibrous materials) was impregnated with a catalyst solution which includes methanol, isopropanol (MeOH:IPA—95:5 (w/w)) and 0.5 weight percent dibutyltin dilaurate to form a catalyst-treated material. At least a portion or all of the solvent was removed by heating the catalyst-treated material at 250 degrees F. for 40 seconds to form a catalyst-impregnated material having a volatile content of 2.8 wt. %. The catalyst impregnated material was treated by coating one side with a polyisocyanate composition, which includes 13 wt. % triacetin and 87 wt. % polyisocyanate resin (Mondur 541 Light PMDI available from Bayer Polymers, Pittsburgh, Pa.), to form a polyisocyanate-impregnated fibrous material. The polyisocyanate composition has a Brookfield viscosity of about 100 to 105 cps as applied (at 80 degrees F.). The polyisocyanate-impregnated fibrous material was cured to provide a resin-impregnated fibrous sheet having a resin content of about 29.4 weight percent by heating the polyisocyanate-impregnated fibrous material in a 300 degree F. oven for about 3 minutes. This converted the resin in the polyisocyanate-impregnated fibrous material to a C-stage resin.

Example 6

A resin-impregnated fibrous sheet was formed according to the following process. Amotfors Natural Saturating Kraft (58 lbs/1000 ft$^2$) (e.g., fibrous material) was impregnated with a catalyst solution which includes methanol, isopropanol (MeOH:IPA—95:5 (w/w)) and 0.5 weight percent dibutyltin dilaurate to form a catalyst-treated material. Substantially all of the solvent was removed by heating the catalyst-treated material at 250 degrees F. for 50 seconds to form a catalyst-impregnated material having a volatile content of 2.7 wt. %. The catalyst impregnated material was treated by coating one side with a polyisocyanate composition, which includes 13 wt. % triacetin and 87 wt. % polyisocyanate resin (Mondur 541 Light PMDI available from Bayer Polymers, Pittsburgh, Pa.), to form a polyisocyanate-impregnated fibrous material. The polyisocyanate composition has a Brookfield viscosity of about 100 to 105 cps as applied (at 80 degrees F.). The polyisocyanate-impregnated fibrous material was cured to provide a resin-impregnated fibrous sheet having a resin content of about 63.0 weight percent by heating the polyisocyanate-impregnated fibrous material in a 300 degree F. oven for about 3 minutes. This converted the resin in the polyisocyanate-impregnated fibrous material to a C-stage resin.

Example 7

Fibrous sheets similar to those in EXAMPLES 4 and 5 were formed using a polyisocyanate composition without using a solvent where the polyisocyanate composition has a Brookfield viscosity of about 95 to 108 cps as applied (at about 90 to 95 degrees F.).

Example 8

A resin-impregnated fibrous sheet formed by EXAMPLES 5, 6 and 7 was further modified according to the following process. A phenolic glueline coating resin formulation was applied by coating one side of the fibrous sheet using a Mayer rod to a coating weight of about 55 g/m$^2$. The fibrous sheet was heated at 250 degrees F. for about 3.5 minutes to form a glueline-coated sheet. The glueline-coated sheet was bonded to a substrate (e.g., Douglas fir plywood, Off-shore hardwood, etc.) by pressing the sheet and substrate together for about 6.5 minutes at 285 degrees (200 psi) to form a laminated fibrous substrate sheet.

Example 9

The laminated fibrous substrate sheets of EXAMPLE 8 were evaluated with the following tests: (a) Cobb Ring testing; (b) Checking Resistance testing; (c) Paintability; and (d) Internal Bonding.

(a) Cobb Ring testing serves as a means for the measurement of a liquid that passes through a wetted overlay and is subsequently absorbed and retained by the underlying wood substrate. Cobb Ring tests were run with eight hour exposure with water and 2% NaOH solution. For the Mead-Westvaco N.K. Linerboard samples that included a solvent, averages of 10.76 g/ft$^2$ water and 45.91 g/ft$^2$ NaOH were recorded. For the Mead-Westvaco N.K. Linerboard samples that did not include a solvent, averages of 9.71 g/ft$^2$ water and 46.17 g/ft$^2$ NaOH were recorded. For the Amotfors N.K. samples that included a solvent, averages of 4.78 g/ft$^2$ water and 15.59 g/ft$^2$ NaOH were recorded.

(b) Checking Resistance Testing measures the ability of the laminated overlay to resist crack propagation when subjected to 160 degrees F. for 16 hours. whereas low values provide better results. Resistance tests were run on one sided panels. For the Mead-Westvaco N.K. Linerboard samples that included a solvent and were bonded to Douglas Fir Plywood, an average value of 1 was obtained. For the Mead-Westvaco N.K. Linerboard samples that included a solvent and were bonded to Off-Shore Hardwood, an average value of 0 was obtained. For the Mead-Westvaco N.K. Linerboard samples that did not include a solvent and were bonded to Douglass Fir Plywood, an average value of 1 was obtained. For the Mead-Westvaco N.K. Linerboard samples that did not include a solvent and were bonded to Off-Shore Hardwood, an average value of 0 was obtained. For the Amotfors N.K. samples that included a solvent and were bonded to Douglass Fir Plywood and Off-Shore Hardwood, average values of 0 were obtained.

(c) Paintability testing involved using latex and oil based alkyd primers to determine the adhesion characteristics to the substrate. The paint is applied with a 0.0025" coater, dried for 16 hours, and scribed with a crosshatch tool. Tape is applied to the crosshatch paint and removed to determine the percent of squares remaining on the substrate with a higher number being more desirable. For the Mead-Westvaco N.K. Linerboard samples that included a solvent, average values of 2% for latex and 98% for alkyd were obtained. For the Mead-Westvaco N.K. Linerboard samples that did not include a solvent, average values of 1% for latex and 16% for alkyd were obtained. For the Amotfors N.K. samples that included a solvent, average values of 80% for latex and 95% for alkyd were obtained.

(d) Internal bond testing involves bonding both faces of the overlay to 2"×2" steel blocks and using a tensile test machine to quantify the force needed to separate the overlay with higher values being more desirable For the Mead-Westvaco N.K. Linerboard samples that included a solvent, an average value of 671 psi was obtained. For the Mead-Westvaco N.K. Linerboard samples that did not include a solvent, an average value of 624 psi was obtained. For the Amotfors N.K. samples that included a solvent, an average value of 999 psi was obtained.

It is important to note that the method and systems described in the exemplary embodiments herein are provided for illustrative purposes only. Although only a few embodiments of the present inventions have been described in detail in this disclosure, those skilled in the art who review this disclosure will readily appreciate that many modifications are possible (e.g., variations in values of parameters, etc.) without materially departing from the novel teachings and advantages of the subject matter recited herein. Other substitutions, modifications, changes and omissions may be made in the design, operating conditions and arrangement of the preferred and other exemplary embodiments without departing from the scope of the present inventions.

FURTHER ILLUSTRATIVE EXAMPLES

1. A method of forming an impregnated fibrous sheet comprising:
   impregnating a fibrous material with a tin catalyst to form a catalyst-impregnated material;
   treating the catalyst-impregnated material with a polyisocyanate composition to form a polyisocyanate-impregnated fibrous material; and
   curing the polyisocyanate-impregnated fibrous material to provide a resin-impregnated fibrous sheet.

2. The method of embodiment 1 wherein the curing step comprises heating the polyisocyanate-impregnated fibrous material.

3. The method of embodiment 2 wherein the curing step comprises heating the polyisocyanate-impregnated fibrous material under pressure.

4. The method of embodiment 1 wherein the treating step comprises treating the catalyst-impregnated material with a sufficient amount of the polyisocyanate composition to provide a resin-impregnated fibrous sheet with a resin content of about 10 to 75 wt. %.

5. The method of embodiment 1 wherein the tin catalyst comprises dialkyl tin dicarboxylate, trialkytin hydroxide, dialkytin oxide, dialkyltin dialkoxide, dialkyltin dihalide or a mixture thereof.

6. The method of embodiment 5 wherein the dialkyl tin dicarboxylate comprises diethyl tin diacetate, dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), dibutyltin-bis(2-dimethylaminopentylate) or a mixture thereof.

7. The method of embodiment 5 wherein the dialkyltin dihalide comprises dibutyltin dichloride, dioctyltin dichloride, dilauryltin dichloride, or a mixture thereof.

8. The method of embodiment 1 wherein the tin catalyst comprises tin(II) carboxylate.

9. The method of embodiment 7 wherein the tin(II) carboxylate comprises tin(II) acetate, tin(II) octoate, tin(II) ethylhexoate, tin(II)laurate, or a mixture thereof.

10. The method of embodiment 1 wherein the tin catalyst comprises dibutyltin dilaurylmercaptide, trimethyltin hydroxide, tributyltin hydroxide, trioctyltin hydroxide, dibutyltin oxide, dioctyltin oxide, dilauryltin oxide, dibutyltin-bis(isopropoxide), or a mixture thereof.

11. The method of embodiment 1 wherein the treating step comprises coating one side of the catalyst-impregnated material with the polyisocyanate composition.

12. The method of embodiment 1 wherein the impregnating operation comprises treating the fibrous material with a catalyst solution which includes catalyst solvent and the tin catalyst.

13. The method of embodiment 12 wherein the catalyst solvent includes one or more alkanols, typically having 1-6 carbon atoms.

14. The method of embodiment 13 wherein the catalyst solution includes at least about 85 wt. % MeOH.

15. The method of embodiment 14 wherein the catalyst solution further comprises isopropanol.

16. The method of embodiment 12 wherein the solvent comprises methanol, ethanol, butanol, isopropanol, or a mixture thereof.

17. The method of embodiment 12 wherein the catalyst solution comprises a functional additive.

18. The method of embodiment 17 wherein the functional additive comprises a colorant 19. The method of embodiment 12 wherein the impregnating operation further comprises removing at least a portion of the solvent from the fibrous material before impregnating the catalyst-impregnated material with the polyisocyanate composition.

20. The method of embodiment 19 wherein the removing operation impregnating operation comprises removing sufficient volatiles from the fibrous material to provide a catalyst-impregnated material having a volatile content of about 2 to 4 wt. %.

21. The method of embodiment 19 wherein the removing step comprises heating the fibrous material treated with the catalyst solution material.

22. The method of embodiment 19 wherein the removing step comprises heating the material at a temperature of about 200 to 300 degrees F., preferably about 225 to 275 degrees F.

23. The method of embodiment 19 wherein the removing step comprises subjecting the fibrous material treated with the catalyst solution to a vacuum.

24. The method of embodiment 1 wherein the polyisocyanate composition comprises solvent and polyisocyanate resin.

25. The method of embodiment 24 wherein the solvent comprises ketone solvent, carbonate solvent, phthalate diester, phosphate triester, ether solvent, polyol ester, alkyl acetate, polycarboxylate alkyl ester or a mixture thereof.

26. The method of embodiment 24 wherein the solvent comprises phthalate diester.

27. The method of embodiment 26 wherein the phthalate diester comprises dialkyl phthalate, diaralkyl phthalate, alkyl aralkyl phthalate or a mixture thereof.

28. The method of embodiment 26 wherein the phthalate diester comprises butyl benzyl phthalate.

29. The method of embodiment 24 wherein the solvent comprises polycarboxylate alkyl ester.

30. The method of embodiment 29 wherein the polycarboxylate alkyl ester comprises trialkyl citrate, dialkyl succinate or a mixture thereof.

31. The method of embodiment 29 wherein the polycarboxylate alkyl ester comprises triethyl citrate.

32. The method of embodiment 24 wherein the solvent comprises polyol ester.

33. The method of embodiment 32 wherein the polyol ester comprises glycerol trimester.

34. The method of embodiment 33 wherein the glycerol trimester comprises triacetin.

35. The method of embodiment 24 wherein the solvent comprises carbonate solvent.

36. The method of embodiment 35 wherein the carbonate solvent comprises alkylene carbonate, dialkyl carbonate or a mixture thereof.

37. The method of embodiment 35 wherein the carbonate solvent comprises propylene carbonate.

38. The method of embodiment 22 wherein the solvent comprises aromatic solvent.

39. The method of embodiment 25 wherein the aromatic solvent comprises halogenated benzene, alkylated benzene or a mixture thereof.

40. The method of embodiment 1 wherein the polyisocyanate composition has a Brookfield viscosity of no more than about 250 cps at 77 degrees F.

41. The method of embodiment 1 wherein the polyisocyanate composition has a Brookfield viscosity of about 80 to 140 cps at 77 degrees F.

42. The method of embodiment 1 wherein the fibrous material is a kraft paper or a linerboard.

43. The method of embodiment 1 wherein the fibrous material comprises chemically pulped wood fiber, thermomechanical wood pulp, mechanically defibered wood pulp, or a mixture thereof.

44. The method of embodiment 1 wherein the curing operation comprises heating the polyisocyanate-impregnated fibrous material at about 250 to 350 degrees F., typically 280 to 310 degrees F.

45. The method of embodiment 44 wherein the curing operation comprises heating the polyisocyanate-impregnated fibrous material under a pressure.

46. The method of embodiment 1 wherein the curing operation comprises heating the polyisocyanate-impregnated fibrous material under pressure of no more than about 50 psig.

47. The method of embodiment 12 wherein the catalyst solution further comprises one or more functional additives.

48. The method of embodiment 47 wherein the functional additive comprises a colorant.

49. The method of embodiment 47 wherein the functional additive comprises a release agent.

50. A polyisocyanate-impregnated fibrous sheet produced by the method of any of embodiments 1 to 49.

51. A method of forming an impregnated fibrous sheet comprising:
   impregnating a fibrous material with a catalyst solution which includes first solvent and a tin catalyst to form a catalyst-treated material;
   removing at least a portion of the solvent from the catalyst-treated material to form a catalyst-impregnated material;
   treating the catalyst-impregnated material with a polyisocyanate composition to form a polyisocyanate-impregnated fibrous material;
   curing the polyisocyanate-impregnated fibrous material to provide a resin-impregnated fibrous sheet;
   wherein the resin-impregnated fibrous sheet has a resin content of about 10 to 75 weight percent.

52. The method of embodiment 51 wherein the curing step comprises heating the polyisocyanate-impregnated fibrous material under pressure.

53. The method of embodiment 51 wherein the curing step comprises heating the polyisocyanate-impregnated fibrous material sufficiently to convert the polyisocyanate composition to at least a C-stage resin.

54. The method of embodiment 51 wherein the fibrous material is a kraft paper.

55. The method of embodiment 51 wherein the fibrous material is a linerboard.

56. The method of embodiment 51 wherein the fibrous material comprises chemically pulped wood fiber, a thermomechanical wood pulp, a mechanically defibered wood pulp, or a mixture thereof.

57. The method of embodiment 51 wherein the removing step comprises heating the catalyst-treated material.

58. The method of embodiment 51 wherein the catalyst-impregnated material has a volatile content of about 2 to 4 wt. %.

59. The method of embodiment 51 wherein the removing step comprises heating the catalyst-treated material at a temperature of about 200 to 300 degrees F.

60. The method of embodiment 51 wherein the removing step comprises subjecting the catalyst-treated material to a vacuum.

61. The method of embodiment 51 wherein the tin catalyst comprises dialkyl tin dicarboxylate.

62. The method of embodiment 37 wherein the first solvent comprises alkanol having 1 to 6 carbon atoms.

63. The method of embodiment 51 wherein the catalyst solution comprises dibutyltin dilaurate, methanol and isopropanol.

64. The method of embodiment 63 wherein the catalyst solution further comprises an alcohol soluble dye.

65. The method of embodiment 51 wherein the treating step comprises coating one side of the catalyst-impregnated material with the polyisocyanate composition.

66. The method of embodiment 51 wherein the polyisocyanate composition comprises a second solvent and the polyisocyanate resin.

67. The method of embodiment 66 wherein the second solvent comprises ketone solvent, carbonate solvent, phthalate diester, phosphate triester, ether solvent, polyol ester, alkyl acetate, polycarboxylate alkyl ester, or a mixture thereof.

68. The method of embodiment 66 wherein the second solvent comprises propylene carbonate.

69. The method of embodiment 66 wherein the second solvent comprises triacetin, triethyl citrate, or a mixture thereof.

70. The method of embodiment 66 wherein the second solvent comprises benzyl butyl phthalate ester.

71. The method of embodiment 51 wherein the polyisocyanate composition has a Brookfield viscosity of no more than about 250 cps at 77 degrees F.

72. The method of embodiment 58 wherein the polyisocyanate composition has a Brookfield viscosity of about 80 to 140 cps at 77 degrees F.

73. A polyisocyanate-impregnated fibrous sheet produced by the method of embodiment any of embodiments 51 to 72.

74. A fibrous sheet comprising:
   a fibrous material impregnated with a tin catalyst and a cured polyisocyanate resin.

75. The fibrous sheet of embodiment 74 comprising about 10 to 75 wt. % of the cured polyisocyanate resin.

76. The fibrous sheet of embodiment 74 comprising about 20 to 35 wt. % of the cured polyisocyanate resin.

77. The fibrous sheet of embodiment 74 comprising about 30 to 75 wt. % of the cured polyisocyanate resin.

78. The fibrous sheet of embodiment 74 wherein the fibrous material is a kraft paper.

79. The fibrous sheet of embodiment 74 wherein the fibrous material is a linerboard.

80. The fibrous sheet of embodiment 74 wherein the fibrous material comprises chemically pulped wood fiber, thermomechanical wood pulp, mechanically defibered wood pulp, or a mixture thereof.

81. The fibrous sheet of embodiment 74 comprising about 0.05 to 0.25 wt. % of the tin catalyst.

82. The fibrous sheet of embodiment 74 wherein the tin catalyst comprises dibutyltin dilaurate.

83. The fibrous sheet of embodiment 74 wherein the polyisocyanate resin comprises a polymeric diphenylmethane diisocyanate resin.

84. The fibrous sheet of embodiment 74 further comprising a phenolic glueline on at least one side of the fibrous sheet.

85. A method of producing a laminated material comprising:
applying a phenolic glueline to a first side of a resin-impregnated fibrous sheet; and
wherein the resin-impregnated fibrous material is impregnated with a tin catalyst and a polyisocyanate resin, and the resin has been cured to at least a C-stage resin.

86. The method of embodiment 85 further comprising bonding the phenolic side of the fibrous sheet to a substrate.

87. The method of embodiment 86 wherein the bonding operation comprises heating the fibrous sheet and substrate in a press at about 250 to 300 degrees F.

88. The method of embodiment 86 wherein the bonding operation comprises heating the fibrous sheet and substrate under a pressure of 150 to 250 psi.

89. The method of embodiment 86 wherein the substrate comprises multi-layer composite material.

90. The method of embodiment 86 wherein the substrate is fiberboard, plywood or particleboard.

91. A method of producing a laminated material comprising:
providing a resin-impregnated fibrous sheet having a phenolic glueline on a side; wherein the resin-impregnated fibrous material is impregnated with a tin catalyst and a polyisocyanate resin, and the resin has been cured to at least a C-stage resin; and
bonding the phenolic side of the resin-impregnated fibrous sheet to a substrate.

What is claimed is:

1. A method of forming an impregnated fibrous sheet comprising:
impregnating a fibrous material with a tin catalyst to form a catalyst-impregnated material;
removing sufficient volatiles from the fibrous material to provide a catalyst-impregnated material having a volatile content of about 2 to 4 wt. %; then
treating the catalyst-impregnated material with a polyisocyanate resin composition to form a polyisocyanate-impregnated fibrous material; and
curing the polyisocyanate-impregnated fibrous material to provide a resin-impregnated fibrous sheet.

2. The method of claim 1 wherein the curing step comprises heating the polyisocyanate-impregnated fibrous material.

3. The method of claim 2 wherein the curing operation comprises heating the polyisocyanate-impregnated fibrous material at about 250 to 350 degrees F.

4. The method of claim 2 wherein the curing operation comprises heating the polyisocyanate-impregnated fibrous material under pressure of no more than about 50 psig.

5. The method of claim 2 wherein the curing step comprises heating the polyisocyanate-impregnated fibrous material sufficiently to convert the polyisocyanate composition to at least a C-stage resin.

6. The method of claim 1 wherein the tin catalyst comprises tin(II) carboxylate.

7. The method of claim 1 wherein the impregnating operation comprises treating the fibrous material with a catalyst solution which includes catalyst solvent and the tin catalyst.

8. The method of claim 7 wherein the catalyst solvent includes one or more alkanols having 1-6 carbon atoms.

9. The method of claim 7 wherein the catalyst solution comprises a colorant.

10. The method of claim 1 wherein the polyisocyanate composition comprises a second solvent and polyisocyanate resin.

11. The method of claim 10 wherein the second solvent comprises triethyl citrate, triacetin or a mixture thereof.

12. The method of claim 10 wherein the second solvent comprises propylene carbonate.

13. The method of claim 10 wherein the second solvent comprises phthalate diester.

14. The method of claim 1 wherein the polyisocyanate composition has a Brookfield viscosity of no more than about 250 cps at 77 degrees F.

15. The method of claim 1 further comprising applying a phenolic glueline to at least one side of the resin-impregnated fibrous sheet.

16. A method of producing a laminated material comprising:
providing a resin-impregnated fibrous sheet having a phenolic glueline on a side; wherein the resin-impregnated fibrous material is impregnated with a tin catalyst and a polyisocyanate resin, and the resin has been cured to at least a C-stage resin; and
bonding the phenolic side of the resin-impregnated fibrous sheet to a substrate.

17. The method of producing a laminated material according to claim 16, wherein the resin-impregnated fibrous material is formed in a step of impregnating a fibrous material with a tin catalyst and a polyisocyanate resin.

18. The method of producing a laminated material according to claim 17, wherein the impregnating step comprises
impregnating the fibrous material with a tin catalyst and a solvent,
removing at least a portion or all of the solvent,
then impregnating the fibrous material containing the tin catalyst with a polyisocyanate resin.

* * * * *

UNITED STATES PATENT AND TRADEMARK OFFICE
CERTIFICATE OF CORRECTION

| | | |
|---|---|---|
| PATENT NO. | : 7,601,398 B2 | Page 1 of 1 |
| APPLICATION NO. | : 11/347595 | |
| DATED | : October 13, 2009 | |
| INVENTOR(S) | : Andrew N. Dion | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 576 days.

Signed and Sealed this

Fifth Day of October, 2010

David J. Kappos
*Director of the United States Patent and Trademark Office*